(12) United States Patent
Tsuda et al.

(10) Patent No.: US 7,379,396 B2
(45) Date of Patent: May 27, 2008

(54) ROTARY DISK TYPE STORAGE DEVICE

(75) Inventors: Shingo Tsuda, Kanagawa (JP); Hiroshi Yanagisawa, Kanagawa (JP); Keishi Takahashi, Kanagawa (JP)

(73) Assignee: Hitchi Global Storage Technologies Netherlands B.V., Amsterdam (NL)

( * ) Notice: Subject to any disclaimer, the term of this patent is extended or adjusted under 35 U.S.C. 154(b) by 863 days.

(21) Appl. No.: 10/892,512

(22) Filed: Jul. 14, 2004

(65) Prior Publication Data

US 2005/0036240 A1 Feb. 17, 2005

(30) Foreign Application Priority Data

Aug. 15, 2003 (JP) ............................. 2003-293722

(51) Int. Cl.
 *G11B 7/085* (2006.01)
 *G11B 5/012* (2006.01)
(52) U.S. Cl. ................................. 369/30.03; 360/245.9
(58) Field of Classification Search ............ 369/30.03, 369/30.04, 21; 360/256.4, 97.01, 245.9
 See application file for complete search history.

(56) References Cited

U.S. PATENT DOCUMENTS

2005/0219738 A1* 10/2005 Iida et al. ................. 360/97.01

FOREIGN PATENT DOCUMENTS

| JP | 05-101607 A | 4/1993 |
| JP | 07-192449 A | 7/1995 |
| JP | 08-006726 A | 1/1996 |

\* cited by examiner

*Primary Examiner*—Ali Neyzari
(74) *Attorney, Agent, or Firm*—Townsend and Townsend and Crew LLP; Rambod Nader (57) ABSTRACT

Embodiments of the present invention provide a portable rotary disk type storage device provided with a form factor allowing dimensions of an accommodation space in a longitudinal and a lateral direction to be reduced. In one embodiment, the storage device has a head disk assembly provided with a rotary disk recording medium and a casing accommodating the rotary disk recording medium and forming a totally closed space. The device further has a PCB provided with a connection pad disposed substantially parallel with a recording surface of the rotary disk recording medium and connectable to a host system connector and a control circuit for the head disk assembly and connected to the head disk assembly with an FCP and mechanically released therefrom. Housings accommodating the head disk assembly and the PCB and having an opening portion in alignment with the connection pad are provided.

24 Claims, 8 Drawing Sheets

ROTARY DISK TYPE STORAGE DEVICE

BACKGROUND OF THE INVENTION

The present invention relates to a rotary disk type storage device such as a magnetic disk device, an optical magnetic disk device, and the like, provided with an interface connector to be connected to a connector of a host system.

The magnetic disk device can store a large amount of digital data. With the recent trend in needs toward greater capacities and progress in making devices even more compact and reduced weight, there is a mounting need for the magnetic disk device as a storage device for digital contents made up of voice, image, and other types of data. Digital contents are recorded in recording media and very often used in many different fields. As a result, there have been increased cases where the magnetic disk device is demounted from its original host system, such as a personal computer or the like for use in another host system.

The magnetic disk device is generally provided with an interface connector for connecting the device to a host system. A disk-shaped magnetic disk is rotatably supported inside the magnetic disk device. The diameter of the magnetic disk, therefore, substantially governs the external dimensions of the magnetic disk device. The dimension in a direction running parallel with a recording surface of the magnetic disk (hereinafter referred in this specification to as a longitudinal or lateral direction relative to the magnetic disk device or a space in the host system accommodating the magnetic disk device) becomes greater than the dimension in a direction perpendicular to the recording surface of the magnetic disk (hereinafter referred in this specification to as a height direction relative to the magnetic disk device or the space in the host system accommodating the magnetic disk device).

An accommodation space provided in the host system for accommodating the magnetic disk device is therefore shaped flat, being small in the height direction and large in the longitudinal and lateral directions. Further, a terminal of the interface connector for the magnetic disk device has conventionally been provided to be connected from the longitudinal or lateral direction.

Figure 1:
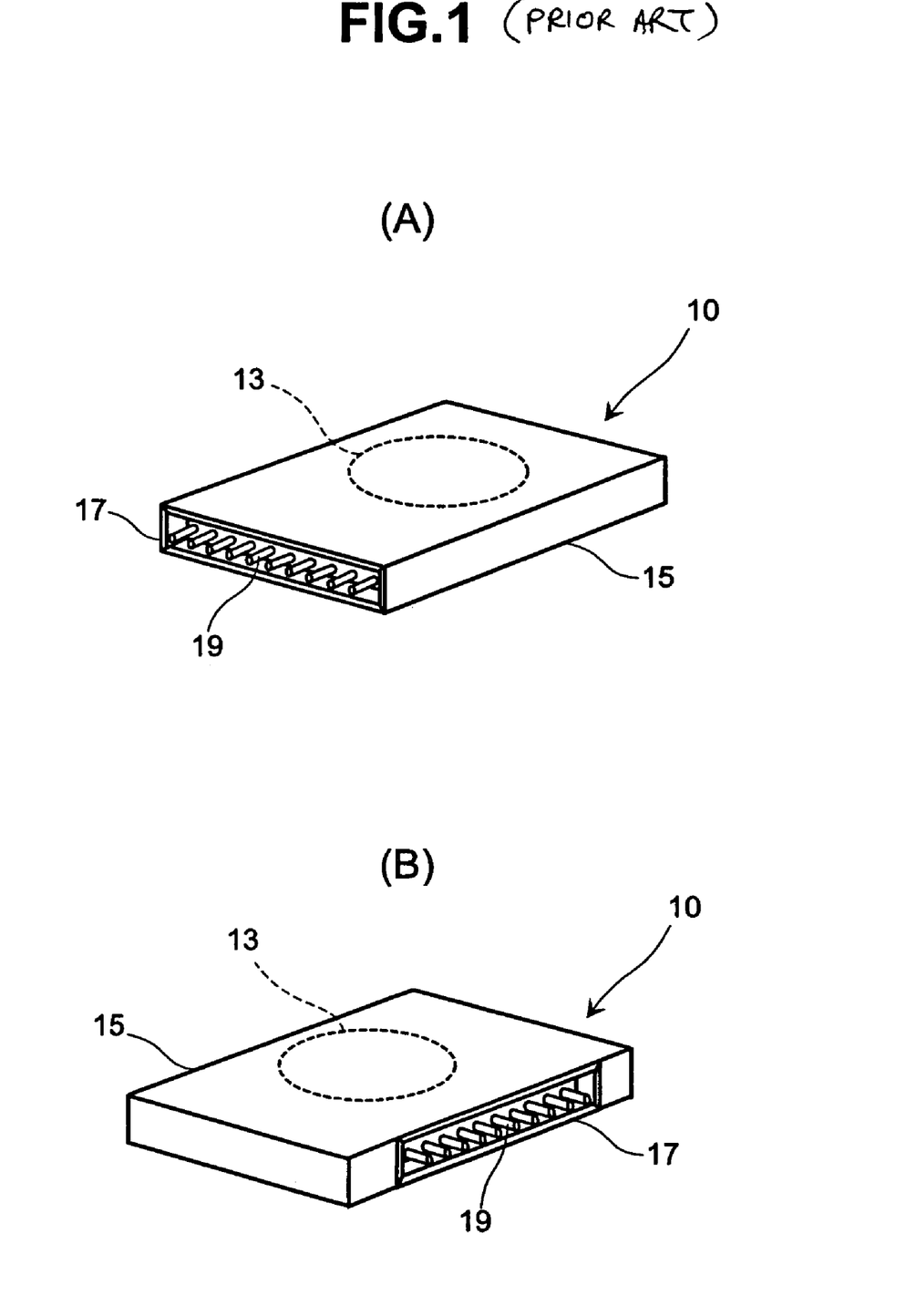
FIGS. 1(A) and 1(B) are perspective views of conventional magnetic disk devices.

A magnetic disk device having such a configuration as that described in the foregoing is shown, for example, in FIG. 6 of Japanese Patent Laid-open No. Hei 5-101607. The magnetic disk device disclosed in this reference is considered to have a plurality of magnetic disks stacked one on top of another. The disk device seems to be relatively tall. Because of the increased storage capacity per magnetic disk in recent years, however, later magnetic disk devices have come to be provided with only one disk, or have the smaller number of stacked disks as compared with the conventional ones. As a result, the later magnetic disk devices have come to be shaped even thinner, as shown in FIGS. 1(A) and (B), with the dimensions in the longitudinal and lateral directions even further enlarged relative to the dimension in the height direction. The accommodation space in the host system has therefore been shaped even thinner, being even smaller in the height direction and larger in the longitudinal and lateral directions.

Referring to FIG. 1(A), a magnetic disk device 10 has a magnetic disk 13 accommodated in a casing 15 and is provided with an interface connector 17 on an end portion of a housing. The terminal 19 of the interface connector 17 is arranged so as to permit access from the longitudinal direction parallel with a recording surface of the magnetic disk 13. Another interface connector (hereinafter referred to in this specification simply as the "connector" when reference is made to the interface connector on the host system side) is provided in the accommodation space in the host system for connecting to the interface connector 17. This second interface connector consumes part of the volume in the accommodation space of the host system in the longitudinal direction.

In the magnetic disk device shown in FIG. 1(A), the interface connector is disposed so as to provide access to its pins from the longitudinal direction. In the magnetic disk device shown in FIG. 1(B), on the other hand, the interface connector 17 is disposed so as to provide access to its terminal from the lateral direction. Although not shown in the figures, a printed circuit board mounted with a control circuit for the magnetic disk device is secured to a bottom surface of the casing 15 in FIGS. 1(A) and 1(B).

A technique is known in which a magnetic disk device main body is mounted on a printed circuit board and a connector for connecting to an external device is provided adjacent thereto on the printed circuit board so as to allow access to the connector from the height direction of the magnetic disk device. Such a technique is shown, for example, in FIG. 11 of the aforementioned Japanese reference.

In Japanese Patent Laid-open No. Hei 8-6726, a portable type magnetic disk device, which is supposed to be demounted from the host system and carried freely, is particularly exposed to a greater possibility of being subjected to impacts due to drop or contact with other objects. The magnetic disk device is nonetheless a precision machine provided therein with a head actuator mechanism and controlled so that a head floats above a front surface of a rotating disk to read or write data while keeping a slight gap from the surface. The device must therefore be appropriately protected from external impacts.

Many magnetic disk devices adopt actuator lock mechanisms of various types in order to prevent the head and the magnetic disk from coming into contact with each other and being damaged. This is done by locking the actuator mechanism, should an external impact be applied while the device remains inactive. The problem is, however, that these improvements are simply not sufficient for providing protection from large impacts, such as dropping of the magnetic disk device.

Figure 2:
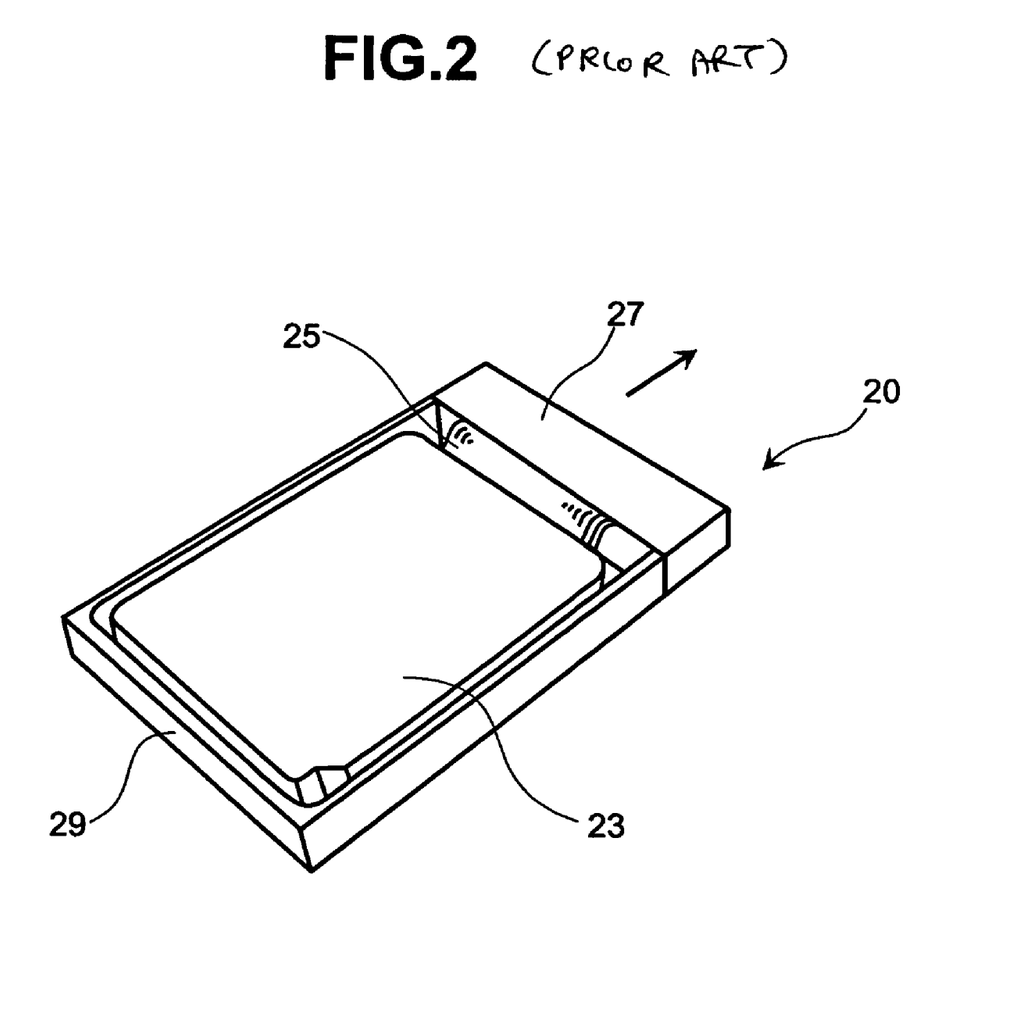
FIG. 2 is a perspective view of a conventional portable magnetic disk device.

There is known an approach to improving impact resistance of the portable type magnetic disk device. Specifically, a housing provided with a cushioning material for prevention of impacts is incorporated to cover the entire body of a general-purpose magnetic disk device. An interface connector is then mounted in the housing for establishing an electric connection with a host system. Such a technique is disclosed in Japanese Patent Laid-open No. Hei 7-192449. FIG. 2 is a perspective view showing an outline of a portable magnetic disk device 20 using a general-purpose magnetic disk device 23. The portable type magnetic disk device 20 is configured as described in the following. Specifically, the general-purpose magnetic disk device 23 is accommodated in a housing 29 and an interface connector 27 is provided on an end portion of the housing 29. The general-purpose magnetic disk device 23 is composed of a head disk assembly (HDA), a printed circuit board mounted with an electronic circuit for controlling the HDA, and an interface connector, which are physically integrated together.

One end of a flexible cable (FC) 25 is connected to the interface connector of the magnetic disk device 23. The other end of the flexible cable 25 is connected to the interface connector 27 of the portable type magnetic disk device 20. The terminal of the interface connector 27 is disposed so as to provide access from the longitudinal direction of the portable type magnetic disk device 20. Inserting the portable type magnetic disk device 20 into a bay of the host system and pushing the device 20 in the direction of the arrow will directly connect the device 20 to a connector on the host system.

An impact absorbing material for cushioning is provided between the housing 29 and the magnetic disk device 23. A known technique for applying the impact absorbing material to such a use is disclosed in, for example, Japanese Patent Laid-open No. Hei 11-37198. The portable magnetic disk device 20 removed from the host system may be dropped or hit against an object during transportation, causing the housing 29 or the interface connector 27 to give impact to the general-purpose magnetic disk device 23. Even under this condition, the impact to the general-purpose magnetic disk device 23 is softened, thus preventing the magnetic disk device 23 from being damaged.

In the conventional magnetic disk device 10 and the portable type magnetic disk device 20 shown in FIGS. 1(A), 2(B), and 2, however, access to the interface connector terminal is established in the longitudinal or lateral direction, as applicable, of the corresponding magnetic disk device. To provide a connector for connecting to the interface connector in the accommodation space for the magnetic disk device allotted on the host system side, therefore, a space in the longitudinal and lateral directions corresponding to the connector is taken up from what is available for the entire accommodation space.

The radius of the magnetic disk substantially governs the outside dimensions of the magnetic disk device. Hence, the dimensions in the longitudinal and lateral directions are greater than that in the height direction. When appropriately establishing the overall dimensions and outline of the host system, a need existed to keep dimensions in the longitudinal and lateral directions small, even if the dimensions the height direction of the accommodation space for the magnetic disk device may be enlarged. When working with the accommodation space for the conventional magnetic disk device, there was necessity to allow for a space for the connector in the longitudinal and lateral directions, in addition to the outside dimensions of the magnetic disk device or the portable type magnetic disk device.

In addition, the general-purpose magnetic disk device 23 is used in the conventional portable magnetic disk device 20 shown in FIG. 2. For that reason, it was necessary to provide the interface connector 27 and the flexible cable 25, in addition to the magnetic disk device 23. This was one of the factors contributing to increased cost.

BRIEF SUMMARY OF THE INVENTION

It is therefore a feature of the present invention to provide a rotary disk type storage device provided with a form factor allowing dimensions in the longitudinal and lateral directions of the accommodation space provided in the host system to be made small. It is another feature of the present invention to provide a rotary disk type storage device provided with a form factor achieving impact resistance with a simplified structure having the reduced number of parts and allowing dimensions in the longitudinal and lateral directions of the host system to be made small. It is still another feature of the present invention to provide a rotary disk type storage device easily mountable to the host system.

It is a further feature of the present invention to provide a rotary disk type storage device easily mountable to a RAID or a blade server.

One feature of the present invention is that, in a rotary disk type storage device provided with an interface connector for connecting to a connector on a host system, the interface connector is configured to provide access thereto from a direction perpendicular to a recording surface of a rotary disk recording medium. This arrangement helps make small dimensions in the longitudinal and lateral directions of the accommodation space provided in the host system. Another feature of the present invention is to provide a rotary disk type storage device that allows a new form of connection when making a daily chain connection or a loop connection of a plurality of rotary disk type storage devices to be accommodated in the RAID, and to make possible a connection method permitting easy connection to a board in order to achieve the blade server. Still another feature of the present invention is that an outside of the rotary disk type storage device is covered with a housing to allow the storage device to provide impact resistance. A further feature of the present invention is that the HDA and the printed circuit board are accommodated in the housing in a mechanically released condition to reduce the number of parts used, instead of the use of a general-purpose magnetic disk device with the HDA and the printed circuit board secured therein.

In accordance with an aspect of the present invention, there is provided a rotary disk type storage device connected to a connector of a host system for use. The storage device comprises a head disk assembly (HDA) including a rotary disk recording medium and a casing accommodating the rotary disk recording medium and forming a totally closed space; a printed circuit board including a control circuit for the head disk assembly and mounted on the casing; and an interface connector disposed inside an orthographic projection of the rotary disk type storage device so as to be accessible from a direction substantially perpendicular to a recording surface of the rotary disk recording medium and allowing connection to the host system connector.

In the present invention, the host system refers to all apparatuses including without limitation a computer, a server, a RAID, a PDA, AV equipment, and a blade server, on which a rotary disk type storage device, such as a magnetic disk device, an optical magnetic disk device, or the like, is mounted. The interface connector is disposed inside the orthographic projection of the rotary disk type storage device so as to be accessible from the direction substantially perpendicular to the recording surface of the rotary disk recording medium. This arrangement allows the host system connector to be provided inside the orthographic projection of storage device. The accommodation space in the host system is therefore not enlarged in the longitudinal or lateral direction in order to dispose the connector. Further, in RAID, the interface connector realizes a new wiring structure when making the daisy chain connection or the loop connection with the interface connector of each storage device. In the blade server, a thin board structure as a whole can be achieved by using the interface connector to mount the storage device together with other modules on the board.

The HDA casing is provided with a guide composed of a slit or a protruding portion to be engaged with a guide provided on the host system. This allows the interface connector to be accurately positioned when the HDA is mounted in the accommodation space and the storage device to be easily mounted. The slit or the protruding portion is formed in the direction substantially perpendicular to the recording surface of the recording medium. When the storage device is to be mounted in the accommodation space by sliding the device in the direction perpendicular to the recording surface, therefore, this arrangement eliminates the possibility of misalignment, resulting in a terminal of the interface connector or the connector in the accommodation space being damaged, even if the host system connector is hard to be seen. The arrangement thus permits direct connection between the interface connector and the host system connector.

The interface connector may be formed integrally with the casing in order to simplify manufacturing processes. The interface connector is composed of a terminal and a structural portion supporting the terminal. Forming the interface connector integrally to the casing means that the structural portion is molded with the same material as that used for the casing through integral molding. The interface connector may still be manufactured using a material different from that used for the casing and later attached to the casing. This approach gives a greater degree of freedom in design when selecting a place for disposing the interface connector in the casing.

The printed circuit board may be disposed substantially parallel with the recording surface of the recording medium and the interface connector be provided as a connection pad formed as a pattern on the printed circuit board. This arrangement eliminates the need for providing separately the interface connector and allows the host system connector to be provided inside the orthographic projection of the storage device.

Mounting the interface connector on the printed circuit board facilitates jobs for making an electric connection between the interface connector and the printed circuit board and for installation. The arrangement also enhances a degree of freedom in selecting the position of the interface connector.

The head disk assembly may electrically be connected to the printed circuit board using a flexible cable and mechanically be mounted on the same with an impact absorbing support member interposed therebetween. This arrangement allows impacts and vibrations transmitted from the host system by way of the printed circuit board to be damped when the storage device is mounted in the host system. Either the casing or the printed circuit board may be provided with a leg portion protruding in the direction of accessing the interface connector. This enhances positioning accuracy within the accommodation space and helps protect the connector when the storage device is handled as a single piece.

In accordance with a second aspect of the present invention, there is provided a rotary disk type storage device connected to a connector of a host system for use. The storage device comprises a head disk assembly (HDA) including a rotary disk recording medium and a casing accommodating the rotary disk recording medium and forming a totally closed space; a printed circuit board including a control circuit for the head disk assembly and mounted on the casing; an interface connector disposed inside an orthographic projection of the rotary disk type storage device so as to be accessible from a direction substantially perpendicular to a recording surface of the rotary disk recording medium and allowing connection to the host system connector; and a housing accommodating the head disk assembly, the printed circuit board, and the interface connector and provided with an opening portion at a position in alignment with the interface connector.

With such an arrangement, it is possible to provide a rotary disk type storage device offering impact resistance and helping make small the space in the longitudinal and lateral directions in the host system. Since the housing is provided with the opening portion at a position in alignment with the interface connector, the interface connector can be connected to the host system connector by accommodating the housing itself in the accommodation space.

The housing may be provided with a stacked structure of a thermoplastic elastomer and an ABS resin molded together through integral molding. This provides a housing structure offering impact resistance, with a structurally strong core and a flexible surface. A guide is provided on a surface of the housing to facilitate mounting on the host system. The housing may be provided with a partial opening portion and a guide in alignment with the opening portion may be provided on the casing.

In accordance with a third aspect of the present invention, there is provided a rotary disk type storage device connected to a connector of a host system for use. The storage device comprises a head disk assembly (HDA) provided with a rotary disk recording medium and a casing accommodating the rotary disk recording medium and forming a totally closed space; a printed circuit board including a connection pad disposed substantially parallel with a recording surface of the rotary disk recording medium and connectable to the host system connector, and a control circuit for the head disk assembly, and connected to the head disk assembly with a flexible cable for mechanical release; and a housing accommodating the head disk assembly and the printed circuit board and provided with an opening portion at a position in alignment with the connection pad.

With such an arrangement, it is possible to provide the rotary disk type storage device offering impact resistance and cutting down on the interface connector, and the flexible cable connecting the printed circuit board and the interface connector, as compared with the conventional device. Further, the connection pad disposed parallel with the recording surface of the recording medium and provided on the printed circuit board may be used as the interface connector. This diminishes the space in the longitudinal and lateral directions in the host system.

In addition, the printed circuit board and the head disk assembly are mechanically released. An impact or vibration applied externally by way of the housing or the connection pad can be lessened, should it be transmitted to the head disk assembly. By stating that the printed circuit board is mechanically released, it is meant that the printed circuit board is not connected to the head disk assembly using a screw, an adhesive, a fitting structure, or the like, and that the two can be freely moved relative to each other.

By including a frame, to which the printed circuit board and the housing are mounted, the position of the connection pad provided for the printed circuit board can be defined with respect to the frame. It is further possible to enhance strength of the storage device. If the frame is provided with a slit or a protruding portion to be engaged with the guide on the host system, the connection pad can be even more accurately positioned inside the accommodation space, facilitating mounting of the storage device.

A shutter may be provided for covering the opening portion in the housing. This protects the connection pad during transportation and prevents entry of dust and dirt in the housing. Part of the slit or the protruding portion of the frame is provided with a slit opening running substantially parallel with the recording surface of the recording medium. The shutter is provided with an engagement portion to be engaged with the slit opening. By providing the host system with a guide to be engaged with the slit or the protruding portion through this arrangement, the storage device can be mounted in the host system using the guide to open the shutter and expose the connection pad and to be connected to the host system connector.

An insulation sheet may be provided between the head disk assembly and the printed circuit board. This prevents a semiconductor device or a printed pattern mounted on the printed circuit board from being shorted or damaged. The insulation sheet may be formed using a material having also a function as a cushioning material. Impact resistance can even be enhanced by providing an impact absorbing material between the head disk assembly and the housing adjacent thereto.

In accordance with embodiments of the present invention, it is possible to provide a rotary disk type storage device provided with a form factor allowing dimensions in a longitudinal and a lateral direction of the accommodation space provided in a host system to be made small. Further, it is possible to provide a rotary disk type storage device provided with a form factor achieving impact resistance with a simplified structure having the reduced number of parts and allowing dimensions in a longitudinal and a lateral direction of a host system to be made small. In addition, it is possible to provide a rotary disk type storage device easily mountable in a host system.

DETAILED DESCRIPTION OF THE INVENTION

Figure 3:
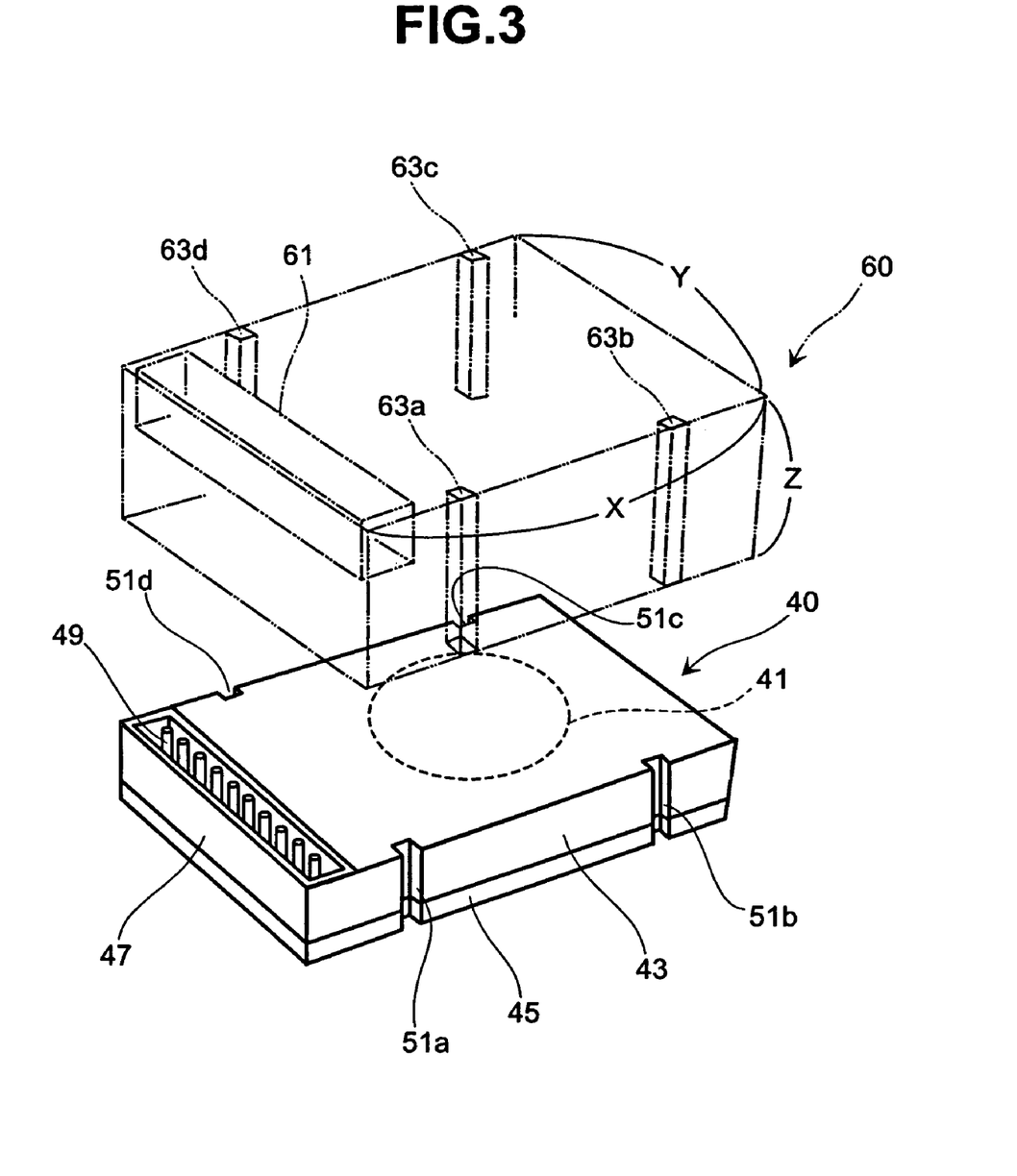
FIG. 3 is a view of a magnetic disk device in accordance with the an embodiment of the present invention.

FIG. 3 is a perspective view showing a general-purpose magnetic disk device 40. The general-purpose magnetic disk device 40 includes a head disk assembly (HDA) 43, a printed circuit board 45 mounted with an electronic circuit for controlling operations of and communications with the HDA 43, and an interface connector 47 for establishing a connection to a host system connector.

The HDA 43 is composed of a single or a plurality of magnetic disks 41 stacked one on top of another, and several other known elements not shown, accommodated in a totally closed space formed by a casing. The known elements include a head for reading and writing data, or performing either operation, an actuator mechanism mounted with the head and positioning the head at a specific required position on a surface of the magnetic disk, and a spindle mechanism for rotating the magnetic disk. The HDA 43 and the printed circuit board 45 are connected to each other using a flexible cable. A portion in the casing through which the flexible cable passes is sealed to secure the totally closed space.

The printed circuit board 45 is generally secured on the outside of the HDA for the following reasons: maintaining of cleanness inside the HDA 43, responding to repairing of requirements arising from an engineering change or manufacturing testing, other manufacturing reasons, and the like. In order to provide the HDA with part of these functions, the HDA may be provided with an electronic circuit. Throughout this specification, the terms of the HDA and the printed circuit board are used to refer to the meanings mentioned above unless otherwise specified.

Referring to FIG. 3, the interface connector 47 is integrally formed with the casing. The interface connector may still be manufactured separately from the casing and later connected thereto using a screw, an adhesive, or the like. If the interface connector is to be integrally formed with the casing, a structural portion of the interface connector is integrally formed with the casing from the same material and only the terminal is later attached to the interface connector. This saves a manufacturing process for the interface connector. If the interface connector is manufactured separately from the casing, on the other hand, it results in an increased degree of freedom in a mounting location thereof.

An important point of the present embodiment is that a terminal 49 of the interface connector 47 is disposed so as to provide accessibility from a direction substantially perpendicular to a recording surface of a magnetic disk 41. Outside dimensions of the general-purpose magnetic disk device 40 shown in FIG. 3 are substantially determined by the diameter of the magnetic disk 41. The magnetic disk device 40 therefore has greater dimensions in the longitudinal and lateral directions and a smaller one in the height direction.

An accommodation space piece 60 provided in the host system for accommodating the magnetic disk device 40 is shown by a dash-double-dot line in FIG. 3. There is provided inside the accommodation space piece 60 a host system connector 61 to be connected to the interface connector 47. The accommodation space piece 60 may be configured as a bay formed as a small compartment that is easily accessible by a user.

Unlike the interface connector terminal of the conventional type shown in FIGS. 1(A) and 1(B), the terminal 49 of the interface connector 47 faces in the direction substantially perpendicular to the recording surface of the magnetic disk 41. Because of this orientation involved of the terminal 49, a longitudinal dimension indicated by symbol X in the accommodation space piece 60 can be defined with reference to an orthographic projection relative to the magnetic disk device 40 in the direction perpendicular to the recording surface of the magnetic disk 41. As a result, there is no need of adding the dimension of the host system connector 61 to the longitudinal dimension X. For the purpose of this specification, the orthographic projection refers to a projected surface produced relative to an outline of the magnetic disk device when parallel rays of light are projected from the direction perpendicular to the recording surface of the magnetic disk.

A dimension in the height direction indicated by symbol Z of the accommodation space piece 60 therefore becomes large. The dimension in the height direction is, however, substantially smaller than a dimension in the longitudinal direction (X) and a dimension in the lateral direction (Y). In the example shown in FIG. 3, therefore, the dimension X in the longitudinal direction is reduced. This enhances the degree of freedom in determining the outside dimensions of the host system, which allows the host system to be built more compact or the outline of the host system to be optimized.

Similarly, the interface connector may be located on the longer side of the casing of the magnetic disk device. It is evident that this arrangement will make smaller the dimension in the lateral direction (Y) of the accommodation space piece.

The interface connector 47 and the host system connector 61 may be constructed so as to permit a direct connection or utilize a flexible cable or some other object interposed between the two connectors for connection. The direction in which the terminal 49 of the interface connector 47 is accessed is, however, established perpendicularly to the recording surface of the magnetic disk. The effect of the present embodiment will therefore be provided, if the dimensions in the longitudinal and lateral directions of the accommodation space piece can be reduced.

Slits 51a to 51d serve as guides formed linearly in the direction perpendicular to the recording surface of the magnetic disk on the outside of the casing of the HDA 43. Linear protruding portions 63a to 63d to be fitted into the slits 51a to 51d, respectively, are provided in the accommodation space piece 60 of the host system. When the magnetic disk device 40 is pushed in the direction perpendicular to the recording surface of the magnetic disk 41, the slits 51a to 51d and the corresponding protruding portions 63a to 63d slide along each other. The slits 51a to 51d and the corresponding protruding portions 63a to 63d thus function as positioning guides for connecting the interface connector 47 to the host system connector 61. As apparent to those skilled in the art, protruding portions may be provided on the side of the magnetic disk device 40 and associated slits to be fitted therewith may be provided on the side of the accommodation space piece 60.

Figure 4:
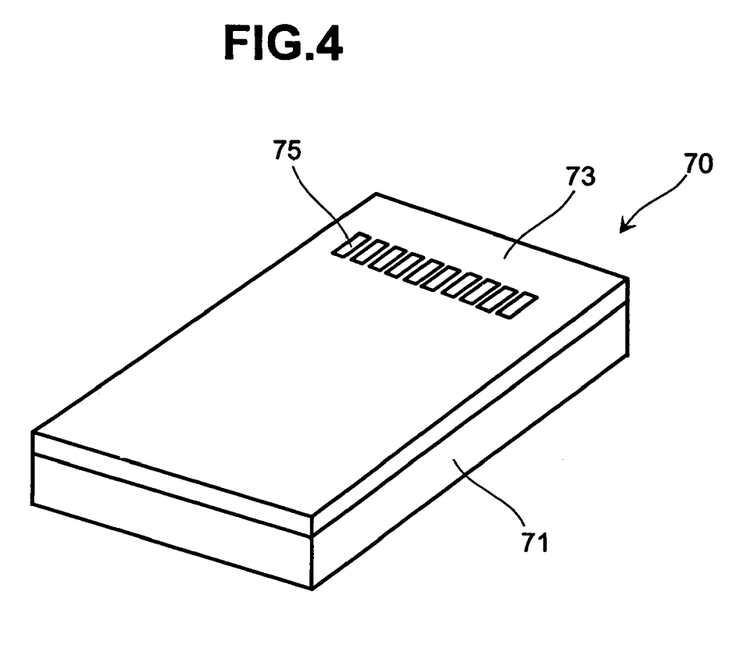
FIG. 4 is a perspective view of a magnetic disk device in accordance with another embodiment of the present invention.

A magnetic disk device 70 according to another embodiment of the present invention will be described with reference to FIG. 4. FIG. 4 is a perspective view of the magnetic disk device 70. The magnetic disk device 70 includes an HDA 71 and a printed circuit board 73. The printed circuit board 73 is secured to the HDA 71 so as to be disposed in parallel with the recording surface of the magnetic disk (not shown) accommodated in the HDA 71. An electric connection is established between the printed circuit board 73 and the HDA 71 through connectors. A connection pad 75 formed as a conductive circuit pattern is formed on the printed circuit board 73. The connection pad 75 allows itself to be used as an interface connector.

A well-known spring connector, as that disclosed for example in Japanese Patent Laid-open No. 2001-051749, may be used as a connector for connection to the connection pad 75. A terminal of the spring connector comes into contact with the surface of the connection pad from a vertical direction and a spring force retains an electric contact between the terminal and the connection pad. As noted above, the printed circuit board 73 is disposed in parallel with the recording surface of the magnetic disk. The connection pad 75 corresponding to the interface connector is therefore invariably provided inside the orthographic projection of the magnetic disk device 70. This makes for a reduced size in both the longitudinal and lateral directions of the accommodation space piece in the host system.

Figure 5:
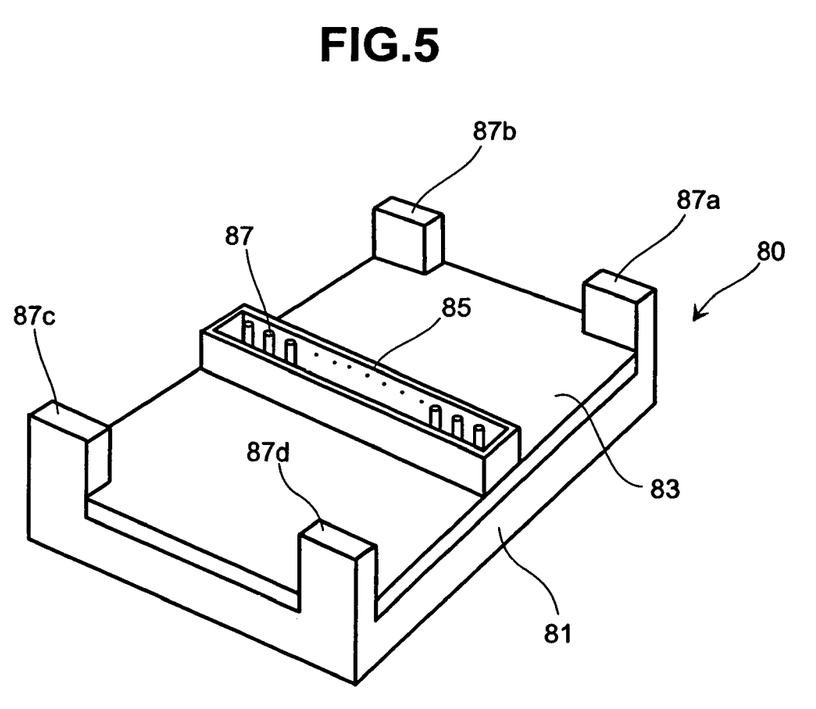
FIG. 5 is a perspective view of a magnetic disk device in accordance with another embodiment of the present invention.

A magnetic disk device 80 according to still another embodiment of the present invention will be described with reference to FIG. 5. FIG. 5 is a perspective view showing the magnetic disk device 80. The magnetic disk device 80 includes an HDA 81, a printed circuit board 83, and an interface connector 85. The interface connector 85 is disposed so as to allow access relative to a terminal 87 thereof from the direction perpendicular to the recording surface of the magnetic disk accommodated in the HDA 81. The terminal 87 is soldered to a circuit pattern on the printed circuit board 83.

Leg portions 87a to 87d are formed on a casing of the HDA 81. The leg portions 87a to 87d protect the interface connector 85 when the HDA 81 is handled as a single piece. In addition, if the length of the leg portions 87a to 87d is adjusted, the position of the magnetic disk device 80 in the height direction can be defined as the device 80 is mounted in the accommodation space piece of the host system. The leg portions may be arranged such that bolts or other members protrude from the printed circuit board 83.

The guides composed of slits and protruding portions, as explained with reference to FIG. 3, may be provided for the leg portions or the casing. This accurately defines the position in the longitudinal and lateral directions in the accommodation space piece. The interface connector 85 shown in FIG. 5 is provided inside the orthogonal projection of the magnetic disk device 80. This reduces the dimensions of the accommodation space piece in the longitudinal and lateral directions in the host system by the dimensions of the interface connector 85.

Figure 6:
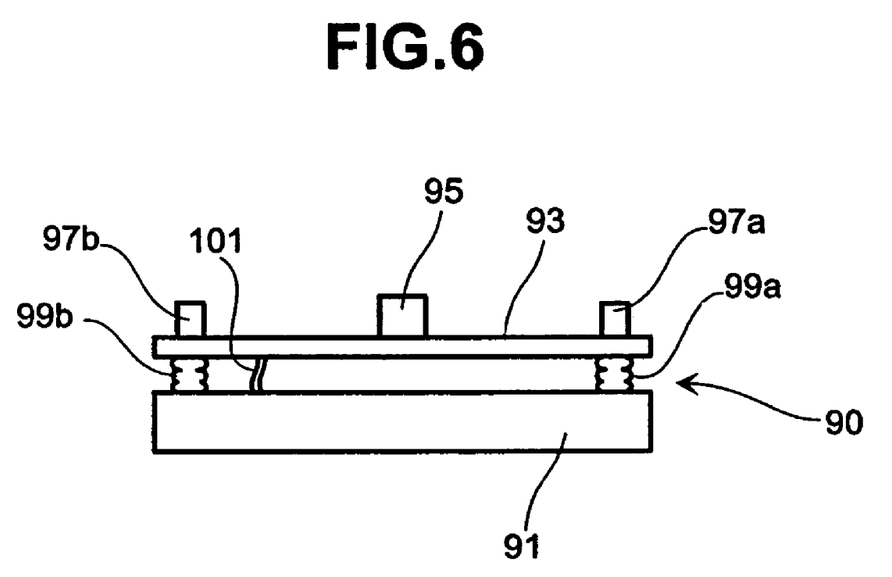
FIG. 6 is a side elevational view of a magnetic disk device in accordance with another embodiment of the present invention.

A magnetic disk device 90 according to a further embodiment of the present invention will be described with reference to FIG. 6. FIG. 6 is a side elevational view of the magnetic disk device 90. The magnetic disk device 90 includes an HDA 91, a printed circuit board 93, and an interface connector 95. The printed circuit board 93 is disposed substantially in parallel with the recording surface of the magnetic disk accommodated in the HDA 91 and mounted with the interface connector 95. There are also provided thereon leg portions 97a, 97b extending in the same direction. FIG. 6 shows two leg portions, but three or more may be provided.

The interface connector 95 is arranged such that a terminal thereof can be accessed from a direction (from an upper portion in FIG. 6) perpendicular to the recording surface of the magnetic disk accommodated in the HDA 91. The interface connector 95 is disposed inside the orthographic projection of the magnetic disk device 90.

The leg portions 97a, 97b have the same function as the leg portions 87a to 87d explained with reference to FIG. 5. The printed circuit board 93 is joined to the HDA 91 with impact absorbing support members 99a, 99b interposed therebetween, which members 99a, 99b are formed, in a rod shape, of rubber or other elastic material. The impact absorbing support members 99a, 99b must be provided with strength sufficient to support the HDA 91 and elasticity for absorbing impact. Three or more of the impact absorbing support members may be provided, instead of two shown in FIG. 6. Instead of using the rod-shaped impact absorbing support members 99a, 99b, a sheet-shaped member may be placed between the printed circuit board 93 and the HDA 91 to secure the HDA 91 in position.

In the magnetic disk device 90, the HDA 91 and the printed circuit board 93 are joined together by means of a flexible cable 101 and the impact absorbing support members 99*a*, 99*b*. Even if impacts or vibrations are applied to the leg portions 97*a*, 97*b* or the printed circuit board 93 mounted in the accommodation space in the host system, the impact absorbing support members 99*a*, 99*b* damp impacts transmitted from the host system to protect the HDA 91.

Each of the magnetic disk devices described with reference to FIGS. 3 to 6 may be configured as a portable magnetic disk device by enclosing the outside thereof with a housing formed of an elastic material. As used herein, the portable magnetic disk device refers to a device that is removably mounted on a host system and an outer portion thereof is covered with a housing for protecting the HDA from impacts encountered when the device drops or hit against an object during transportation. A device having a structure in which the casing of the HDA is subjected to direct impact from the external is not therefore included in the portable magnetic disk device. It is nonetheless not necessary that the entire HDA be covered with the housing.

The "removable" structure is that the magnetic disk device is to be removed and reinstalled by the user under ordinary use. The "removable" structure does not include one in which the magnetic disk device is removed and reinstalled using a special tool, or one in which the magnetic disk device is removed and reinstalled by opening a portion that is not to be opened under ordinary use.

In the portable type magnetic disk device, it is necessary at least that the access face of the interface connector be exposed from the housing in the accommodation space of the host system for connection to the host system connector. It is also evident that the guides provided for the HDA casing described with reference to FIGS. 3 and 5 need be exposed from the housing to be engaged with the guides of the host system.

Figure 7:
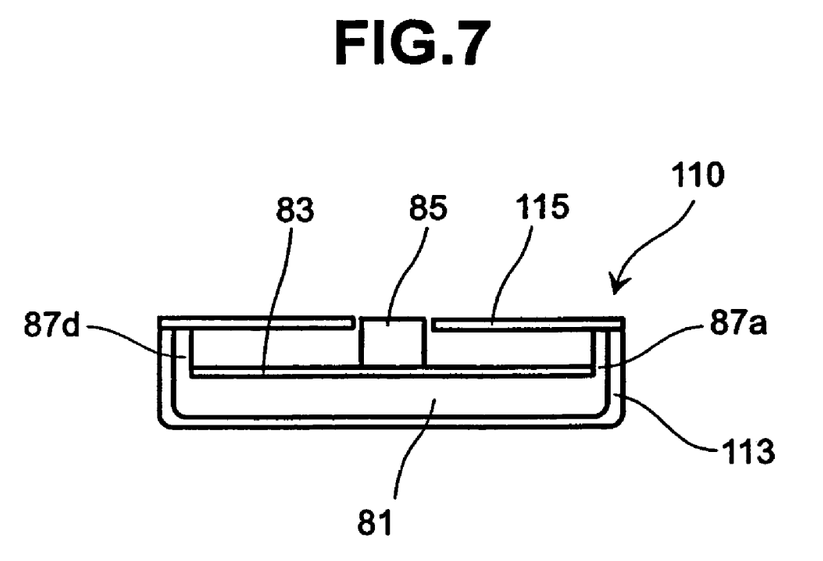
FIG. 7 is a side elevational view of a portable magnetic disk device in accordance with another embodiment of the present invention.

FIG. 7 is a cross-sectional side view of a portable type magnetic disk device 110 in which the magnetic disk device shown in FIG. 5 is enclosed for protection with a housing formed of an impact absorbing material. Like reference numerals are used as those used in FIG. 5 to denote like parts. The magnetic disk device 80 shown in FIG. 5 is accommodated entirely in a housing main body 113 and is further closed by a housing lid 115. FIG. 7 shows a cross section taken along a boundary between a wall in front of the housing main body 113 and the HDA 81.

The housing lid 115 is secured to the casing or the leg portions 87*a* to 87*d* of the HDA 81 using screws or an adhesive. The housing lid 15 is open at a portion of accessing the terminal of the interface connector 85 (at an upper portion in FIG. 7), allowing connection to the host system connector. If a guide for mounting of the disk device onto the accommodation space piece in the host system is to be provided in the leg portions or the casing, a corresponding portion in the housing to cut off to provide an opening portion. The guide may be provided in both the housing main body 113 and the housing lid 115, or either one of them.

Each of the housing main body 113 and the housing lid 115 is formed into a three-layered structure composed of outer layers of thermoplastic elastomer and a center layer of ABS resin sandwiched therebetween. The ABS resin is provided with a predetermined stiffness to give strength to the housing itself as a structural body. The thermoplastic elastomer provides the surface of the housing with flexibility, thereby absorbing impact applied to the component accommodated therein.

Figure 8:
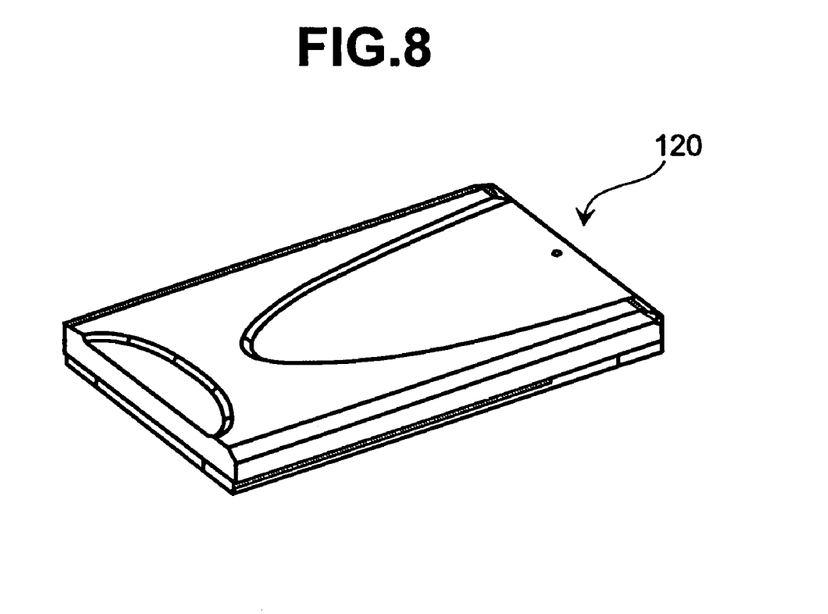
FIG. 8 is a perspective view of a potable type magnetic disk device in accordance with another embodiment of the present invention.
Figure 9:
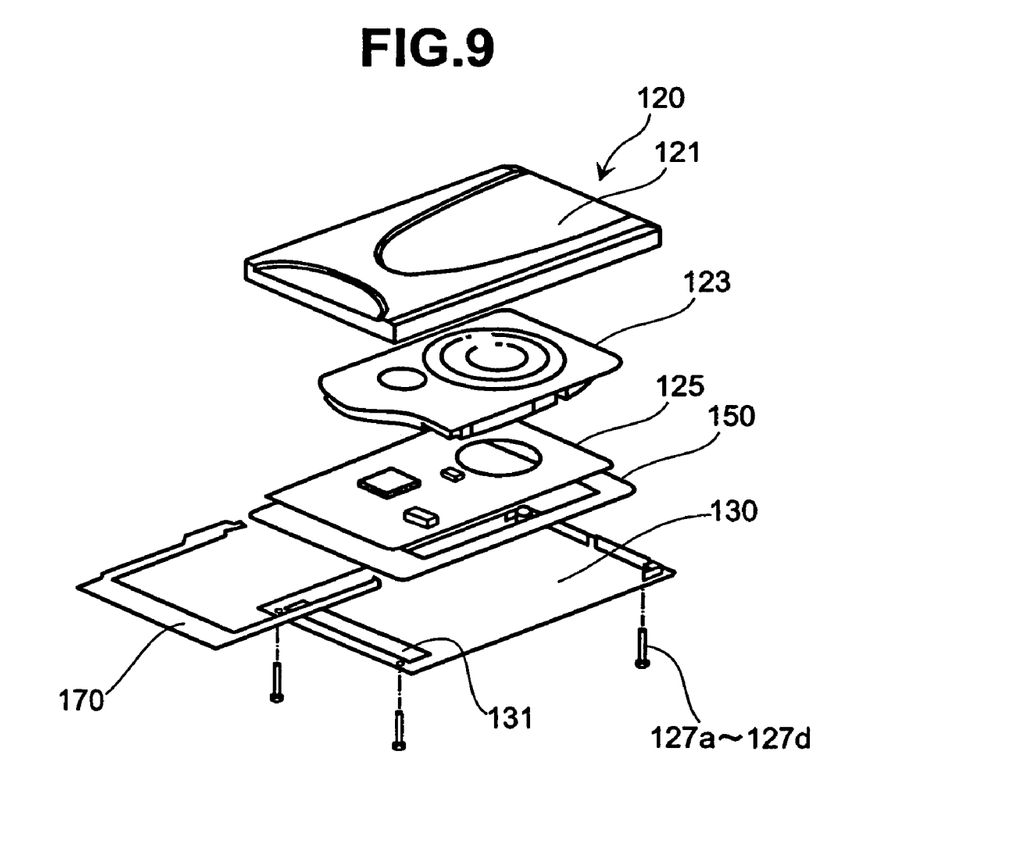
FIG. 9 is an assembly diagram of the potable type magnetic disk device shown in FIG. 8.

FIG. 8 is a perspective view of another potable magnetic disk device 120. FIG. 9 is an assembly drawing of the potable magnetic disk device 120 shown in FIG. 8.

Referring to FIG. 9, the potable type magnetic disk device 120 includes an upper housing 121, an HDA 123, a printed circuit board 125, a frame 150, a shutter 170, and a lower housing 130. The upper housing 121, the printed circuit board 125, the frame 150, and the lower housing 130 are joined together with four screws 127*a* to 127*d*.

Like the portable type magnetic disk device 110 described with reference to FIG. 7, each of the upper portion housing 121 and the lower portion housing 130 is formed as the three-layered structure made of ABS resin and thermoplastic elastomer. The HDA 123 is disposed in the inside of and in abutment against the upper portion housing 121. Although being in contact with the upper housing 121, the HDA 123 is not mechanically joined to the same using a screw or an adhesive, but is released. An impact absorbing material formed of a well-known material may be provided between the upper housing 121 and the HDA 123 to enhance an impact absorbing effect.

A flexible cable (not shown) connected to a head, an actuator mechanism, and a spindle drive mechanism is withdrawn from the casing forming a totally closed space of the HDA 123. This withdrawn flexible cable is electrically connected to the printed circuit board 125. The magnetic disk is provided in the HDA 123 so that the recording surface thereof is situated in a horizontal direction in FIG. 9. The diameter of the magnetic disk substantially governs the dimensions of the HDA 123 in the longitudinal and lateral directions.

The printed circuit board 125 is disposed adjacent to the HDA 123. The surface of the printed circuit board 125 is disposed substantially parallel with the recording surface of the magnetic disk accommodated in the HDA 123. An insulation sheet (not shown) made of a well-known material may be provided between the HDA 123 and the printed circuit board 125. Such an insulation sheet may even be a well-known sheet provided also with an impact absorbing function.

The frame 150 is provided adjacent to the printed circuit board 125. The frame 150 is made of metal shaped into a frame provided with a rectangular opening portion, inside which the printed circuit board 125 can be disposed. The frame 150 thereby provides a structurally skeletal strength for the portable type magnetic disk device 120. Provided adjacent to the frame 150 is the shutter 170, beneath which the lower portion housing 130 is provided. The lower housing 130 is provided with an opening portion 131. The frame 150, the shutter 170, and the lower housing 130 will be described in detail with reference to FIGS. 10 and 11.

Figure 10:
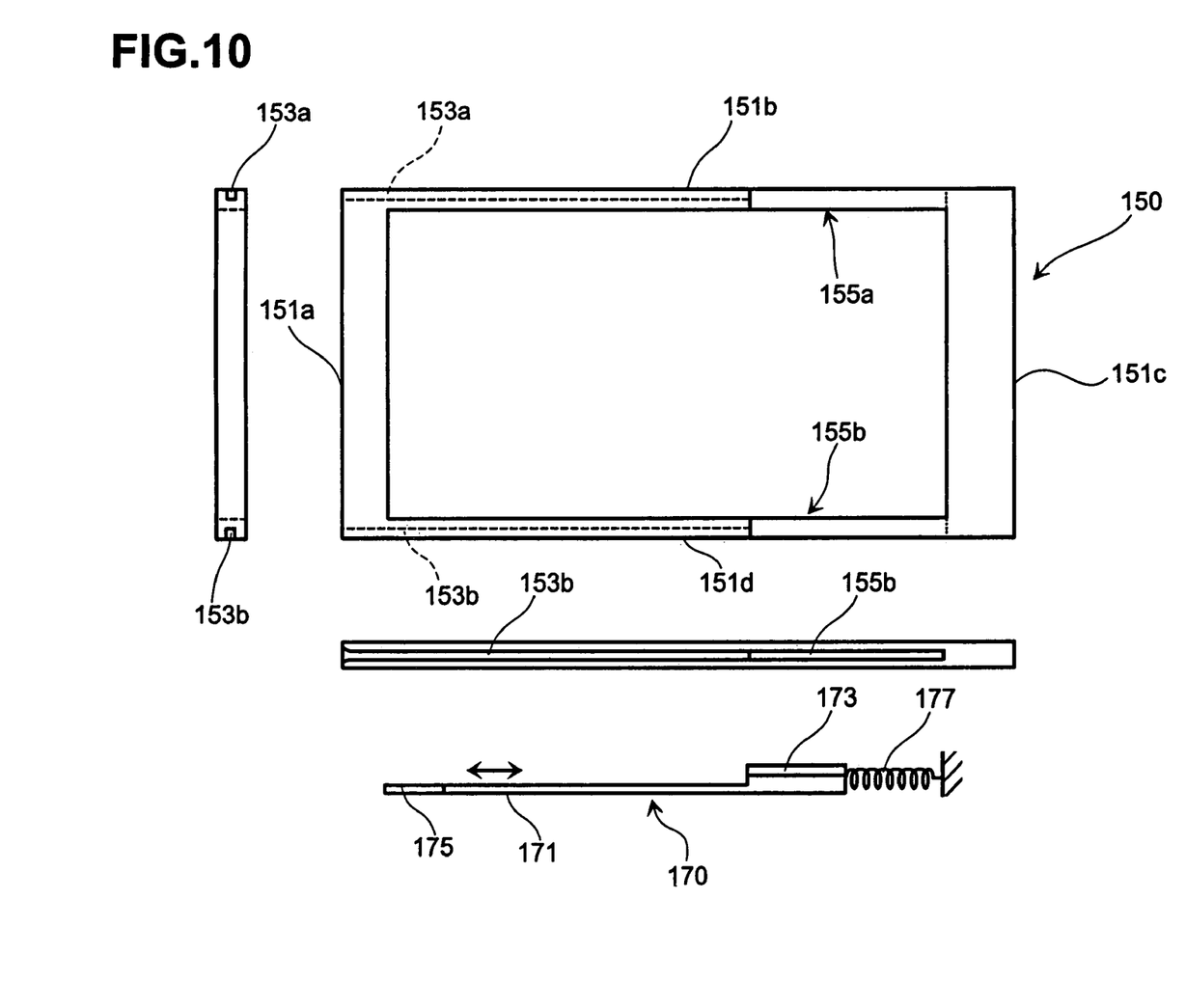
FIG. 10 is a view showing the frame and the shutter used in the portable magnetic disk device shown in FIG. 8.
Figure 11:
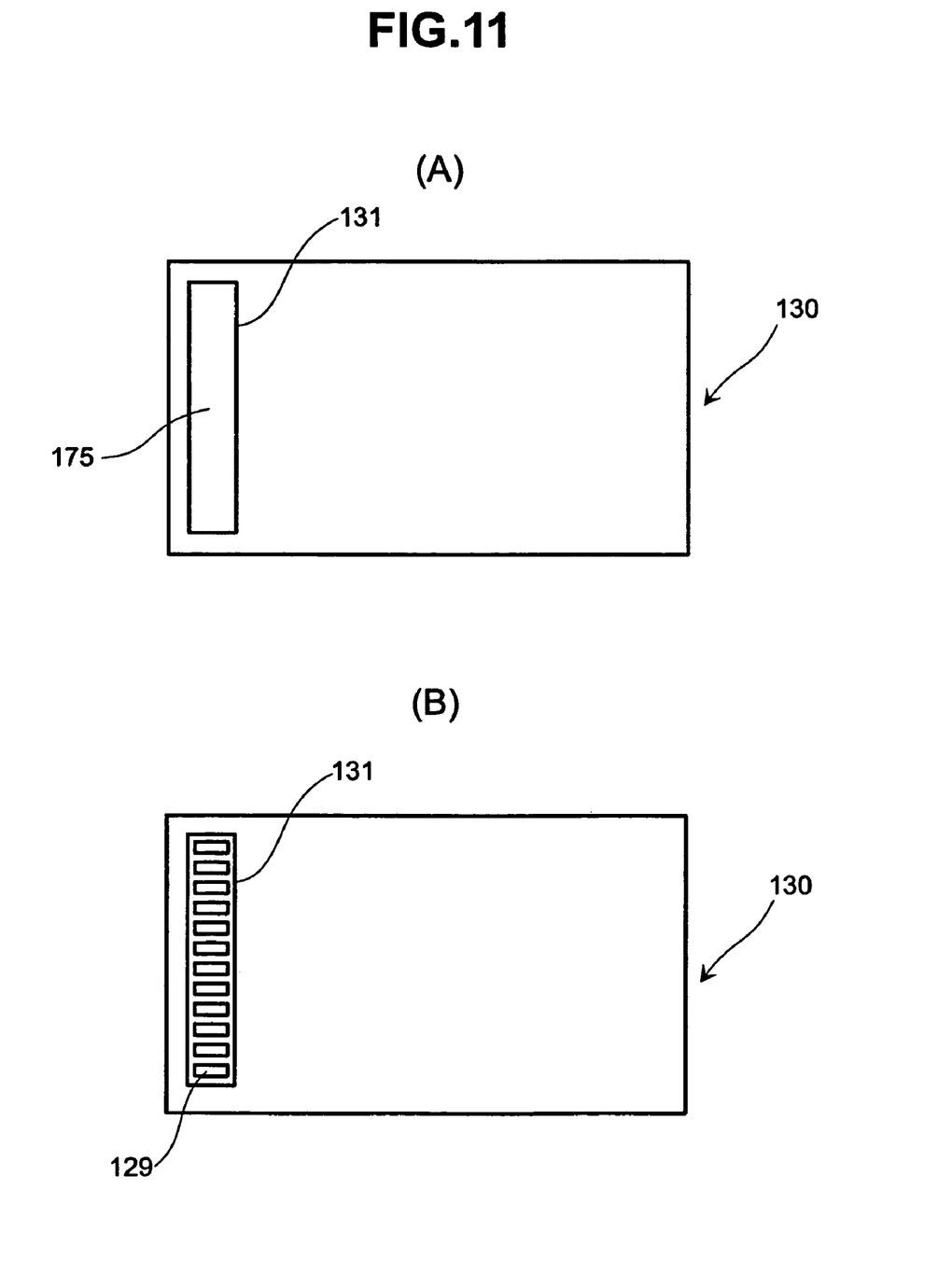
FIGS. 11(A) and 11(B) are views showing structures of terminals used in the portable magnetic disk device shown in FIG. 8.

FIG. 10 includes a plan view and a side elevational view showing the frame 150, and a side elevational view of the shutter 170 drawn in proper positional alignment with the frame 150. The frame 150, provided with the rectangular opening portion therein, is composed of four frame legs 151*a* to 151*d*. Slits 153*a* and 153*b* opening, respectively, in directions of side surfaces are formed in the frame legs 151*b* and 151*d*, respectively. The slits 153*a*, 153*b* extend in length directions of the frame legs 151*b*, 151*d*, respectively. One end of each of the slits 153*a*, 153*b* reaches an outer side surface of the frame leg 151*a*, while the other end thereof is terminated at a boundary with the frame leg 151*c*.

Slit openings 155a, 155b are formed in part of the frame legs 151b, 151d, respectively, at positions near the frame leg 151c. The slit openings 155a, 155b are of the same height (a slit width) as the slits 153a, 153b, respectively. The slit openings 155a, 155b are through bottom portions of the slits to reach inner opening portions of the frame legs 151b, 151d, respectively.

FIG. 10 further shows the side elevational view of the shutter 170. The shutter 170 is provided with a main body 171, a shielding portion 175, and engagement portions 173. The shutter 170 is independently provided from the frame 150, the printed circuit board 125, and the lower housing 130. The shutter 170 is structured so that the main body 171 can slide in the direction of the arrow shown in FIG. 10, while remaining in contact with the printed circuit board 125. The two engagement portions 173 are provided symmetrically. When the shutter 170 is assembled to the magnetic disk device 120, the two engagement portions 173 fit into the slit openings 155a and 155b, respectively, of the frame legs 151b and 151d.

A spring 177, one end of which is connected to the frame, is hooked onto one end of the shutter 170. When the magnetic disk device 120 is not mounted in the host system, the shutter 170 is pressed toward the frame leg 151a. The engagement portions 173 of the shutter 170 are pushed toward the frame leg 151a by a resilient force of the spring 177 up against walls of the slit openings 155a, 155b. The position of the shutter 170 in the direction of the arrow (in the horizontal direction in FIG. 10) is thus defined.

The shielding portion 175 is aligned with the opening portion 131 (see FIG. 9) in the lower housing 130 before the shutter 170 is mounted in the magnetic disk device 120. The shielding portion 175 shields the printed circuit board from external environment, protecting the inside of the housing and preventing entry of dust and dirt.

The manner in which the shielding portion 175 performs its functions will be described with reference to FIGS. 11(A) and 11(B). FIGS. 11(A) and 11(B) illustrate the lower housing 130 of the magnetic disk device 120 as viewed from the outside. FIG. 11(A) shows a state in which the magnetic disk device 120 is not yet mounted in the host system. In this state, the urging of the spring 177 keeps the shielding portion 175 of the shutter 170 in alignment with the opening portion 131, in which the front surface of the printed circuit board 125 is not visible from the outside. FIG. 11(B) shows a state in which the magnetic disk device 120 is mounted in the host system. In this state, the shielding portion 175 of the shutter 170 has slid horizontally to expose a connection pad 129 formed by a well-known circuit pattern technique on the surface of the printed circuit board 125.

The operation of the shutter 170 when the magnetic disk device 120 is mounted in the bay of the host system will be described with reference to FIG. 10. The protruding portions, as those described with reference to FIG. 3, functioning as a guide for controlling the position of the magnetic disk device when the magnetic disk device is mounted in the host system are provided in the accommodation space of the host system. The protruding portions fit in the slits 153a, 153b, sliding along the inside of the slits 153a, 153b when the magnetic disk device 20 is inserted into the bay of the host system. The protruding portions thereby correctly position the magnetic disk device 20 at a required position in the bay and also facilitate the mounting job.

The protruding portions of the host system bay are fitted in the slits 153a, 153b and the magnetic disk device is pushed into the bay with the frame leg 151a at the front. Then, the protruding portions slide along the slits 153a, 153b to be in contact with the engagement portions 173. Overcoming the bias of the spring 177, the protruding portions slide the shutter 170 toward the frame leg 151c.

The engagement portions 173 may be constructed so as to be in contact with another portion provided in the bay, instead of the protruding portions of the bay. The frame may be provided with protruding portions, instead of the slits, for serving as a guide. Through the sequence of these operations, the shielding portion 175, which has been aligned with the opening portion 131 in the lower housing 130, slides toward the frame leg 151c to expose the connection pad 129. The connection pad 129 can then be connected to the host system connector.

When the magnetic disk device rests in the bay, a well-known spring-loaded connector provided in the bay is biased by a spring from the vertical direction, contacting electrically the connection pad 129. The connector can therefore be provided in the bay in the vertical direction relative to the surface of the magnetic disk. This reduces the dimensions of the bay in the longitudinal and lateral directions.

In the portable magnetic disk device 120 constructed as described in the foregoing, the HDA 123 is not secured to, but mechanically released from, the upper housing 121 secured to the frame 150, the printed circuit board 125, and the lower housing 130. Even if impact from a drop or the like is applied to the external case, the impact can never be transmitted directly to the magnetic disk device and impact resistance is secured therefor. Further, since the printed circuit board is mechanically released from the HDA, the impact transmitted from the host system connector via the connection pad is lessened.

The HDA 123 is in contact with the impact absorbing sheet adjacent to the upper housing 121 and the impact absorbing sheet adjacent to the printed circuit board 125. The HDA 123 is not secured to any of these components, except that it is connected to the printed circuit board with the flexible cable, being disposed in a floating condition in a space between the upper housing and the lower housing. The printed circuit board provided with the connection pad is secured to the frame 150 and the frame is provided with the guide composed of slits engaged with the guide in the bay. When the portable magnetic disk device 120 is mounted in the bay of the host system, therefore, the connection pad 129 is correctly aligned with the host system connector.

In comparison with the conventional portable magnetic disk device shown in FIG. 2, the interface connector 27 and the flexible cable 25 in the magnetic disk device according to embodiments of the present invention may be omitted. This contributes to a simplified structure with a reduced number of parts used. This has been achieved for the following reason. Specifically, the HDA and the printed circuit board are handled as an independent component in the housing, whereas the conventional portable type magnetic disk device uses the general-purpose magnetic disk device having the HDA integrated with the printed circuit board.

In addition, the terminal to be connected to the host system connector is formed as the connection pad formed on the printed circuit board. The connection pad is configured so as to allow access from the direction (height direction) perpendicular to the recording surface of the magnetic disk. In the host system, in which the portable magnetic disk device 120 is mounted, therefore, the space in the direction (height direction) perpendicular to the recording surface of the magnetic disk can be used for the connector, thus minimizing the dimensions in the directions parallel with the recording surface (in the longitudinal and lateral directions).

In accordance with the embodiments of the present invention, the frame is made of a material different from that used for the housing and the two parts are thereafter assembled together. The frame and the housing may still be integrally formed. It is also possible not to use the frame to achieve the embodiments by giving locally strength to the housing itself.

Specific embodiments of the present invention have been described. It will be understood that the invention is not limited thereto, including the materials and shapes, but numerous changes in the details of construction may be resorted to without departing from the spirit and the scope of the invention as claimed.

The rotary disk type storage device and the portable rotary disk type storage device in accordance with embodiments of the present invention are applicable to host systems of all kinds for handling digital information, including computers, servers, and home electronic appliances. In particular, highly applicable are storage devices handling and physically transferring digital contents, such as personal computers, digital cameras, AV equipment, and TVs.

What is claimed is:

1. A rotary disk type storage device connected to a connector of a host system for use, comprising:
   a head disk assembly including a rotary disk recording medium and a casing accommodating said rotary disk recording medium and forming a closed space;
   a printed circuit board including a control circuit for said head disk assembly and mounted on said casing; and
   an interface connector disposed inside an orthographic projection of said rotary disk type storage device so as to provide access thereto from a direction substantially perpendicular to a recording surface of said rotary disk recording medium and allowing connection to said connector of the host system.

2. The rotary disk type storage device according to claim 1, wherein said casing includes a guide for mounting in said host system.

3. The rotary disk type storage device according to claim 2, wherein said guide comprises a slit or a protruding portion engaged with a guide provided in said host system.

4. The rotary disk type storage device according to claim 3, wherein said slit or said protruding portion is formed in a direction substantially perpendicular to the recording surface of said rotary disk recording medium.

5. The rotary disk type storage device according to claim 1, wherein said interface connector is mounted in said casing so as to provide access thereto from a direction substantially perpendicular to the recording surface of said rotary disk recording medium.

6. The rotary disk type storage device according to claim 1, wherein said printed circuit board is disposed substantially parallel with the recording surface of said rotary disk recording medium and said interface connector includes a connection pad formed as a pattern on said printed circuit board.

7. The rotary disk type storage device according to claim 1, wherein said interface connector is mounted on said printed circuit board and disposed inside an orthographic projection of said rotary disk type storage device so as to provide access thereto from a direction substantially perpendicular to the recording surface of said rotary disk recording medium.

8. The rotary disk type storage device according to claim 7, wherein said head disk assembly and said printed circuit board are connected with a flexible cable and said head disk assembly is mounted on said printed circuit board with an impact absorbing support member interposed therebetween.

9. The rotary disk type storage device according to claim 7, wherein said casing or said printed circuit board includes a leg portion protruding in a direction of accessing said interface connector.

10. A rotary disk type storage device connected to a connector of a host system for use, comprising:
    a head disk assembly including a rotary disk recording medium and a casing accommodating said rotary disk recording medium and forming a closed space;
    a printed circuit board including a control circuit for said head disk assembly and mounted on said casing;
    an interface connector disposed inside an orthographic projection of said rotary disk type storage device so as to provide access thereto from a direction substantially perpendicular to a recording surface of said rotary disk recording medium and allowing connection to said connector of the host system; and
    a housing accommodating said head disk assembly, said printed circuit board, and said interface connector, and including an opening portion at a position in alignment with said interface connector.

11. The rotary disk type storage device according to claim 10, wherein said housing includes a guide for mounting in said host system.

12. The rotary disk type storage device according to claim 11, wherein said guide comprises a slit or a protruding portion engaged with a corresponding guide provided in said host system.

13. The rotary disk type storage device according to claim 10, wherein said casing includes a casing guide for mounting in said host system and an opening portion at a position corresponding to said guide of said housing.

14. The rotary disk type storage device according to claim 10, wherein said interface connector is mounted in said casing so as to provide access thereto from a direction substantially perpendicular to the recording surface of said rotary disk recording medium.

15. The rotary disk type storage device according to claim 10, wherein said printed circuit board is disposed substantially parallel with the recording surface of said rotary disk recording medium and said interface connector includes a connection pad formed as a pattern on said printed circuit board.

16. The rotary disk type storage device according to claim 10, wherein said interface connector is mounted on said printed circuit board and disposed inside an orthographic projection of said rotary disk type storage device so as to provide access thereto from a direction substantially perpendicular to the recording surface of said rotary disk recording medium.

17. The rotary disk type storage device according to claim 16, wherein said head disk assembly and said printed circuit board are connected with a flexible cable and said head disk assembly is mounted on said printed circuit board with an impact absorbing support member interposed therebetween.

18. A rotary disk type storage device connected to a connector of a host system for use, comprising:
    a head disk assembly including a rotary disk recording medium and a casing accommodating said rotary disk recording medium and forming a totally closed space;
    a printed circuit board including a connection pad disposed substantially parallel with the recording surface of said rotary disk recording medium and allowing connection to said connector of the host system, and a control circuit for said head disk assembly, and connected to said head disk assembly with a flexible cable for mechanical release; and a housing accommodating said head disk assembly and said printed circuit board and provided with an opening portion at a position in alignment with said connection pad.

19. The rotary disk type storage device according to claim 18, further comprising a frame to which said printed circuit board and said housing can be mounted.

20. The rotary disk type storage device according to claim 19, wherein said frame comprises a slit or a protruding portion to be engaged with a guide of said hose system.

21. The rotary disk type storage device according to claim 20, further comprising a shutter for covering the opening portion in said housing, wherein said shutter slides to open said opening portion so as to expose said connection pad when said rotary disk type storage device is accommodated in said hose system.

22. The rotary disk type storage device according to claim 21, wherein a part of the slit or the protruding portion of said frame includes a slit opening in a direction substantially parallel with the recording surface of said rotary disk recording medium and said shutter includes an engagement portion to be engaged with said slit opening.

23. The rotary disk type storage device according to claim 18, wherein an insulation sheet is provided between said head disk assembly and said printed circuit board.

24. The rotary disk type storage device according to claim 18, wherein an impact absorbing material is provided between said head disk assembly and the housing adjacent to said head disk assembly.

* * * * *